US007610346B2

(12) United States Patent
Otake

(10) Patent No.: US 7,610,346 B2
(45) Date of Patent: Oct. 27, 2009

(54) USER CONFIRMATION FOR RETRANSMISSION OF COMPRESSED E-MAIL ATTACHMENTS

(75) Inventor: Ritsuko Otake, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 11/434,079

(22) Filed: May 15, 2006

(65) Prior Publication Data

US 2007/0011254 A1    Jan. 11, 2007

(30) Foreign Application Priority Data

Jun. 7, 2005    (JP) .............................. 2005-167333

(51) Int. Cl.
- H04N 1/00 (2006.01)
- H04N 1/46 (2006.01)
- G06F 15/00 (2006.01)
- G06F 15/16 (2006.01)
- G06K 5/04 (2006.01)
- G03B 27/02 (2006.01)

(52) U.S. Cl. ...................... 709/206; 355/132; 358/1.15; 358/402; 358/403; 358/405; 358/524; 709/246; 709/219

(58) Field of Classification Search ................. 709/206, 709/219, 223; 714/712; 358/1.15, 400, 402, 358/442, 448; 713/152
See application file for complete search history.

(56) References Cited

U.S. PATENT DOCUMENTS

| 5,634,005 | A | * | 5/1997 | Matsuo | ........................ 709/206 |
| 5,826,269 | A | * | 10/1998 | Hussey | ......................... 707/10 |
| 5,864,684 | A | * | 1/1999 | Nielsen | ........................ 709/206 |
| 6,101,244 | A | * | 8/2000 | Okada | .................... 379/100.08 |
| 6,687,741 | B1 | * | 2/2004 | Ramaley et al. | ............. 709/206 |
| 6,785,017 | B1 | * | 8/2004 | Yoshiura | ..................... 358/1.15 |
| 6,816,911 | B1 | * | 11/2004 | Toyoda et al. | ............... 709/238 |
| 6,823,365 | B1 | * | 11/2004 | Mattis et al. | ................ 709/206 |
| 7,000,157 | B2 | * | 2/2006 | Okamoto et al. | ............ 714/712 |
| 7,089,286 | B1 | * | 8/2006 | Malik | ......................... 709/206 |
| 7,209,263 | B2 | * | 4/2007 | Takayama | ................... 358/402 |
| 7,397,575 | B2 | * | 7/2008 | Sekiguchi | .................. 358/1.15 |
| 7,417,756 | B2 | * | 8/2008 | Yamamoto | ................. 358/1.15 |
| 2002/0016818 | A1 | * | 2/2002 | Kirani et al. | ................ 709/203 |
| 2002/0140986 | A1 | * | 10/2002 | Takayama | ................... 358/402 |
| 2002/0156923 | A1 | * | 10/2002 | Tanimoto | .................... 709/246 |
| 2003/0014511 | A1 | | 1/2003 | Maekawa et al. | |

(Continued)

FOREIGN PATENT DOCUMENTS

CN    1398088 A    2/2003

(Continued)

*Primary Examiner*—Joseph E Avellino
*Assistant Examiner*—Tam Phan
(74) *Attorney, Agent, or Firm*—Cowan, Liebowitz & Latman, P.C.

(57) ABSTRACT

A destination address of transmission of designated image data attached to e-mail and a notification destination address to be notified of error information if a transmission error occurs are set. If a transmission error occurs due to size excess of the transmitted e-mail, retransmission confirmation information containing the error information and designate input accept information for accepting designate input which designates whether to execute retransmission of the e-mail in which the transmission error has occurred is generated. The generated retransmission confirmation information is notified to a notification destination specified by the set notification destination address.

11 Claims, 15 Drawing Sheets

| U.S. PATENT DOCUMENTS | | | | | |
|---|---|---|---|---|---|
| 2004/0186892 A1* | 9/2004 | Maruyama et al. ......... 709/206 | | | |
| 2005/0073665 A1* | 4/2005 | Taniguchi et al. ............. 355/53 | | | |

FOREIGN PATENT DOCUMENTS

| CN | 1523806 A | 8/2004 |
|---|---|---|
| JP | A 10-150464 | 6/1998 |
| JP | 2002-044358 | 2/2002 |

* cited by examiner

F I G. 9
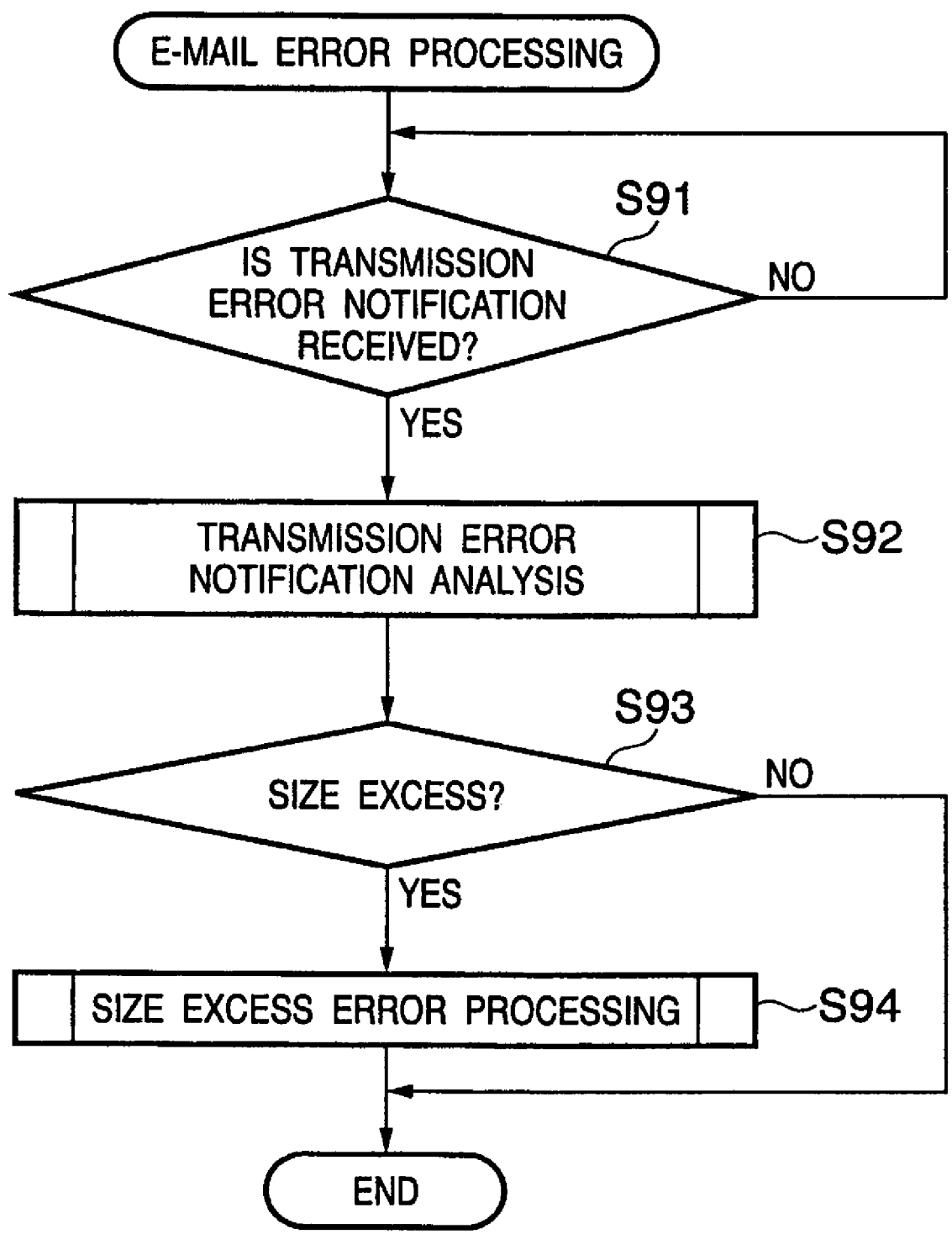

USER CONFIRMATION FOR RETRANSMISSION OF COMPRESSED E-MAIL ATTACHMENTS

FIELD OF THE INVENTION

The present invention relates to an image processing apparatus capable of transmitting image data by attaching it to e-mail, a control method of the apparatus, and a program.

BACKGROUND OF THE INVENTION

A digital multi-functional peripheral having an e-mail transmitting/receiving function generally has a function of transmitting a file of image data generated by scanning a document or image data stored in the device by attaching the file to e-mail. In this case, a transmission error occurs if the volume of the generated file is larger than the limit of an e-mail transmission path or mail server.

Examples of conventionally known processes performed when a digital multi-functional peripheral is notified of a transmission error caused by volume excess by a mail server are a process of printing out the transmission error notification, and a process of transferring error notification mail to a prescribed destination. Also, Japanese Patent Laid-Open No. 2002-044358 proposes an arrangement in which a device itself automatically reduces the file size of image data to be attached to e-mail and retransmit the e-mail.

Furthermore, as a method of automatically controlling the file size, Japanese Patent Laid-Open No. 10-150464 proposes a system which transmits e-mail by, e.g., automatically decreasing the resolution of attached image data, switching compression methods, or dividing the data.

Of the conventional techniques described above, however, in the arrangement in which the device on the transmitting side outputs an error notification, there is no means for directly notifying the user who has performed the transmitting operation of the occurrence of the transmission error. In addition, the user must redo the transmitting operation from the beginning in order to perform retransmission.

Also, in the system which transfers the error notification mail to a prescribed destination, the user can easily notice the occurrence of the transmission error. To perform retransmission, however, the user must redo the transmitting operation on the device from the beginning in this system as well.

Furthermore, in the system which automatically reduces the file size of image data and retransmit the data, there is no means for allowing the user to check the image before retransmission or to select whether to transmit the image or cancel the transmission itself.

SUMMARY OF THE INVENTION

The present invention has been made to solve the above problems, and has as its object to provide an image processing apparatus having an image input/output function and e-mail transmitting/receiving function, a control method of the apparatus, and a program which, if a transmission error occurs in e-mail transmission performed by the image processing apparatus, can effectively notify the transmission error to the user who has requested the transmission of the e-mail, and execute an efficient retransmitting operation.

According to the present invention, the foregoing object is attained by providing an image processing apparatus capable of transmitting image data by attaching the image data to e-mail, comprising:

an e-mail transmitting unit adapted to transmit designated image data by attaching the image data to e-mail;

a setting unit adapted to set a destination address of transmission performed by the e-mail transmitting unit, and a notification destination address to be notified of error information if a transmission error occurs;

a generation unit adapted to, if a transmission error occurs due to size excess of e-mail transmitted by the e-mail transmitting unit, generate retransmission confirmation information containing the error information and designate input accept information for accepting designate input which designates whether to execute retransmission of the e-mail in which the transmission error has occurred; and a notification unit adapted to notify the retransmission confirmation information generated by the generation unit to a notification destination specified by the notification destination address set by the setting unit.

In a preferred embodiment, the generation unit comprises:

a registration unit adapted to register the retransmission confirmation information in a designated registration destination; and an obtain unit adapted to obtain reference information for referring to the retransmission confirmation information registered by the registration unit.

In a preferred embodiment, the notification unit notifies the notification destination of the retransmission confirmation information generated by the generation unit, by e-mail containing the reference information for referring to the retransmission confirmation information.

In a preferred embodiment, the apparatus further comprises a compression unit adapted to generate compressed image data of the image data attached to the e-mail, wherein the generation unit generates the retransmission confirmation information by a webpage described in a structured page description language, and the webpage comprises:
the error information;
the image data attached to the e-mail in which the transmission error has occurred;
the compressed image data corresponding to the image data; and
the designate input accept information.

In a preferred embodiment, the notification unit notifies the notification destination of the retransmission confirmation information generated by the generation unit, by e-mail containing the retransmission confirmation information.

In a preferred embodiment, the apparatus further comprises a compression unit adapted to generate compressed image data of the image data attached to the e-mail, wherein the compression unit generates thumbnail image data of the image data attached to the e-mail in which the transmission error has occurred, and thumbnail image data of the compressed image data corresponding to the image data, the generation unit generates e-mail containing the retransmission confirmation information, and the e-mail comprises:
the error information;
the thumbnail image data of the image data attached to the e-mail in which the transmission error has occurred;
the thumbnail image data of the compressed image data corresponding to the image data; and
the designate input accept information.

In a preferred embodiment, the apparatus further comprises a receiving unit adapted to receive, from the notification destination, confirmation result information corresponding to the retransmission confirmation information notified by the notification unit.

In a preferred embodiment, if the confirmation result information received by the receiving unit indicates designation of retransmission of the e-mail in which the transmission error has occurred, the e-mail transmitting unit transmits the e-mail by replacing the image data attached to the e-mail with the compressed image data.

In a preferred embodiment, the apparatus further comprises:

a reading unit adapted to read a document; and an input unit adapted to input image data across a network, wherein the designated image data comprises one of image data obtained by the reading unit and image data input from the input unit.

According to the present invention, the foregoing object is attained by providing a control method of an image processing apparatus capable of transmitting image data by attaching the image data to e-mail, comprising:

a setting step of setting a destination address of transmission of designated image data attached to e-mail, and a notification destination address to be notified of error information if a transmission error occurs;

a generation step of, if a transmission error occurs due to size excess of the transmitted e-mail, generating retransmission confirmation information containing the error information and designate input accept information for accepting designate input which designates whether to execute retransmission of the e-mail in which the transmission error has occurred; and a notification step of notifying the retransmission confirmation information generated in the generation step to a notification destination specified by the notification destination address set in the setting step.

According to the present invention, the foregoing object is attained by providing a program for causing a computer to control an image processing apparatus capable of transmitting image data by attaching the image data to e-mail, characterized by causing the computer to execute:

a setting step of setting a destination address of transmission of designated image data attached to e-mail, and a notification destination address to be notified of error information if a transmission error occurs;

a generation step of, if a transmission error occurs due to size excess of the transmitted e-mail, generating retransmission confirmation information containing the error information and designate input accept information for accepting designate input which designates whether to execute retransmission of the e-mail in which the transmission error has occurred; and a notification step of notifying the retransmission confirmation information generated in the generation step to a notification destination specified by the notification destination address set in the setting step.

The present invention can provide an image processing apparatus having an image input/output function and e-mail transmitting/receiving function, a control method of the apparatus, and a program which, if a transmission error occurs in e-mail transmission performed by the image processing apparatus, can effectively notify the transmission error to the user who has requested the transmission of the e-mail, and execute an efficient retransmitting operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 is a flowchart showing e-mail error processing of the first embodiment of the present invention;

DETAILED DESCRIPTION OF THE PREFERRED EMBODIMENTS

Preferred embodiments of the present invention will now be described in detail in accordance with the accompanying drawings.

First Embodiment

The configuration of an information processing system including an image processing apparatus of the first embodiment will be explained below with reference to FIG. 1.

Figure 1:
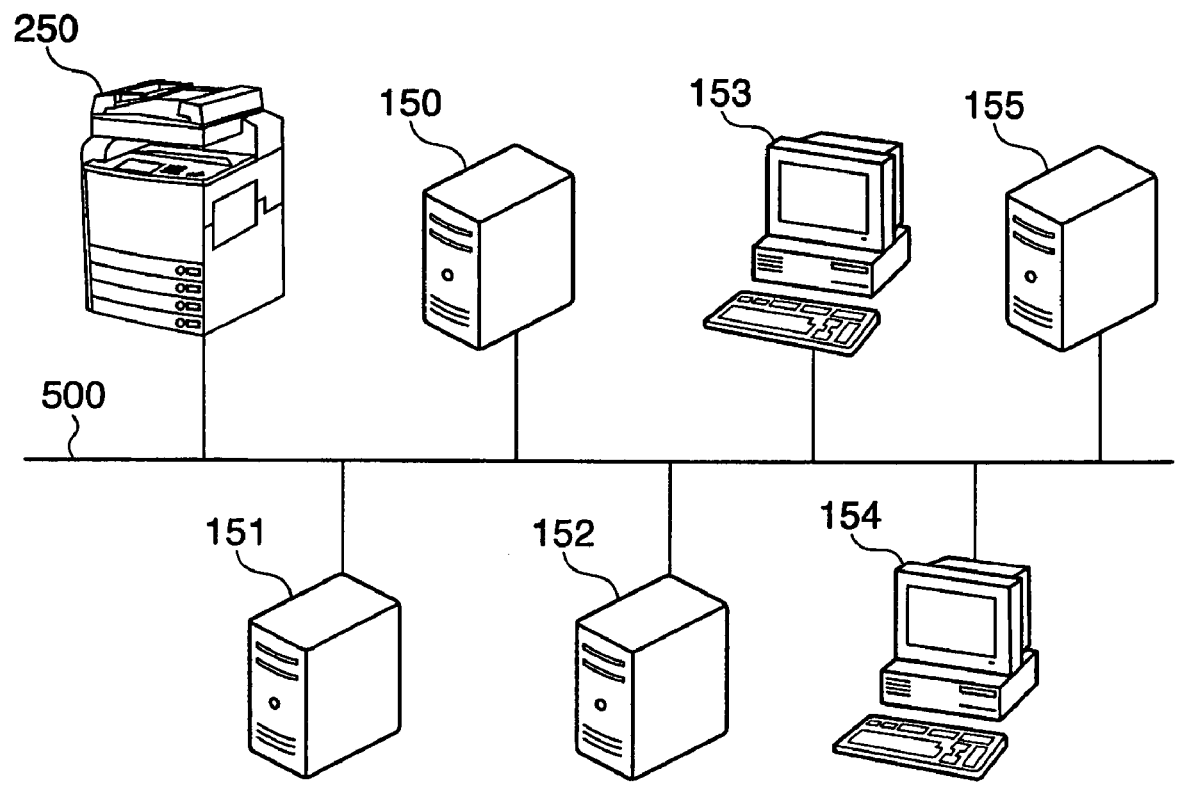
FIG. 1 is a view showing the configuration of an information processing system of the first embodiment of the present invention.

FIG. 1 is a view showing the configuration of the information processing system of the first embodiment of the present invention.

In FIG. 1, reference numerals 150 to 152 denote mail servers. The mail servers 150 to 152 have various functions such as 1) a distributing function of distributing e-mail transmitted from a client (computer) operated by a user to a destination designated by the mail address, 2) a storage function of sorting and storing e-mails transmitted to a mail server into mail boxes of users, 3) a relay function of relaying e-mail between different distribution systems, and 4) a transmitting function of transmitting mail in a mail box to a user's mail program in accordance with a user's request.

Reference numerals 153 and 154 denote computers (clients) used by users. The computers 153 and 154 can execute at least a mail program (mailer) for transmitting/receiving e-mail, and a web browser program for accessing a web server 155.

The web server 155 has various functions such as a function of managing various webpages, and a function of disclosing webpages in accordance with access requests from the web browser programs of the clients.

A digital multi-functional peripheral (image processing apparatus) 250 has various functions such as 1) a copy function of optically reading a document, converting the read document into digital image data, and printing out the data, 2) a transmitting function of transmitting digital image data outside, 3) a print function of printing out the contents of externally received digital image data and e-mail, and 4) a function of transmitting/receiving e-mail. The digital multi-functional peripheral 250 may also have a web server function if necessary.

The above apparatuses are connected to each other across a network 500.

Note that each of the various terminals such as the mail servers 150 to 152, web server 155, and computers 153 and 154 has standard components (e.g., a CPU, RAM, ROM, hard disk, external memory, network interface, display, keyboard, and mouse) of a general-purpose computer. The functions executed by each terminal are implemented by cooperation of these components.

The network 500 is typically one of the Internet, a LAN, a WAN, a telephone line, an exclusive digital line, an ATM, a frame relay line, a communication satellite channel, a cable television line, a data broadcasting radio channel, and the like. Alternatively, the network 500 is a so-called communication network implemented by combining these networks, lines, and channels, and need only be capable of data transmission/reception.

The arrangement of the digital multi-functional peripheral 250 will be explained below with reference to FIG. 2.

Figure 2:
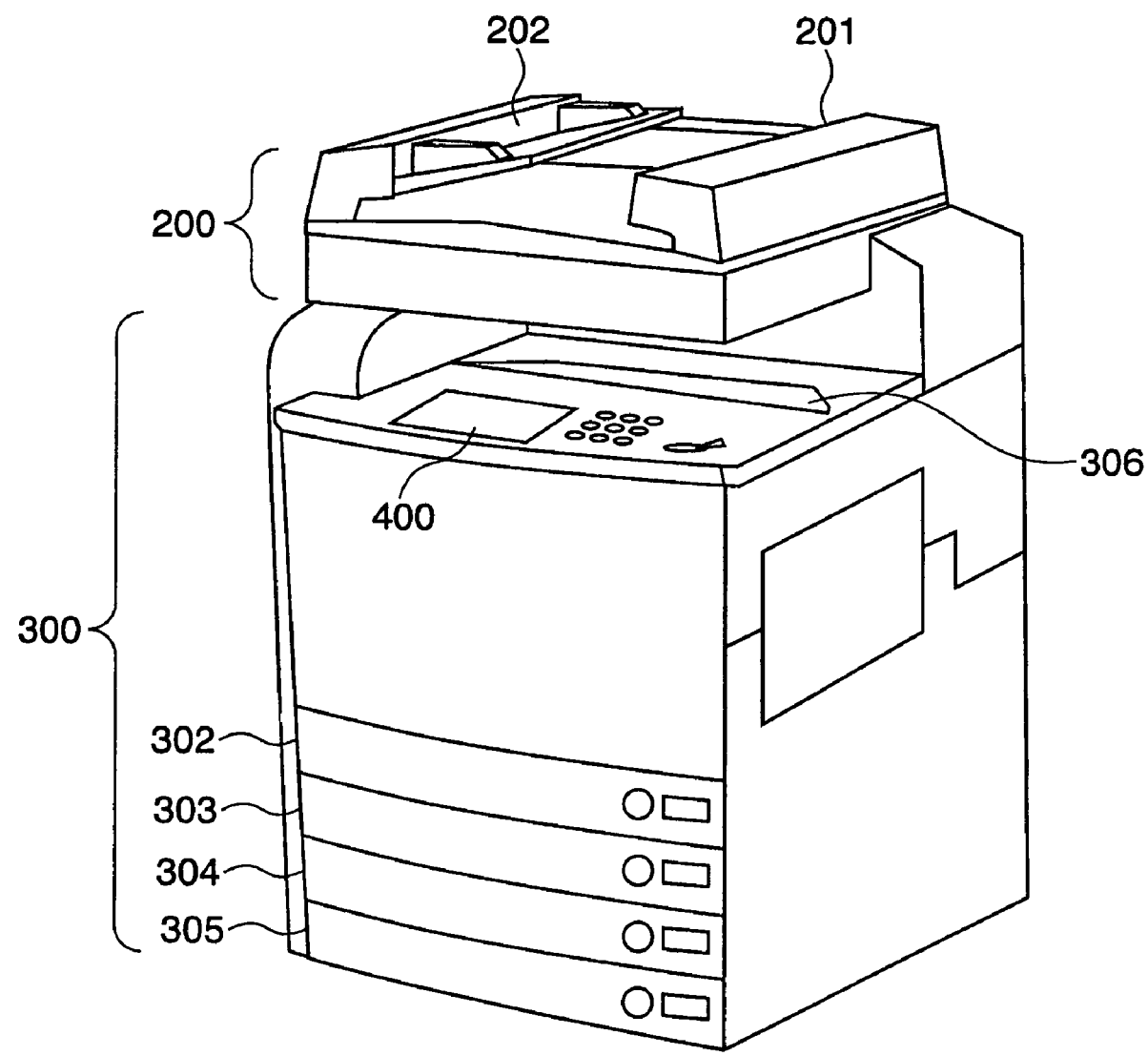
FIG. 2 is a view showing the configuration of a digital multi-functional peripheral of the first embodiment of the present invention.

FIG. 2 is a view showing the arrangement of the digital multi-functional peripheral of the first embodiment of the present invention.

<Image Input Unit (Scanner)>

Referring to FIG. 2, a scanner unit 200 as an image input device illuminates an image on a sheet of paper as a document, and scans a CCD line sensor (not shown), thereby converting the image into an electrical signal as raster image data. Document pages are set in a tray 202 of a document feeder 201. When the user inputs a read instruction from an operation unit 400, a controller CPU 103 (FIG. 3) gives the read instruction to the scanner unit 200, and the document feeder 201 feeds the document pages one by one, thereby executing the document read operation.

<Image Output Unit (Printer)>

Referring to FIG. 2, a printer unit 300 as an image output device converts raster image data into an image on a sheet of paper, and prints the image on the sheet. The output (printing) method can be any of the electrophotographic method using a photosensitive drum or photosensitive belt, the inkjet method which directly prints an image on a sheet of paper by discharging ink from micro nozzle arrays, and the like.

The printing operation is started by an instruction from the controller CPU 103. The printer unit 300 has a plurality of paper feed stages so that different sheet sizes or different sheet directions can be selected, and is equipped with paper cassettes 302 to 305 corresponding to the individual paper feed stages. A paper delivery tray 306 receives printed sheets.

The configuration of a control system of the digital multi-functional peripheral 250 will be explained below with reference to FIG. 3.

<Control System Configuration of Digital Multi-Functional Peripheral>

Figure 3:
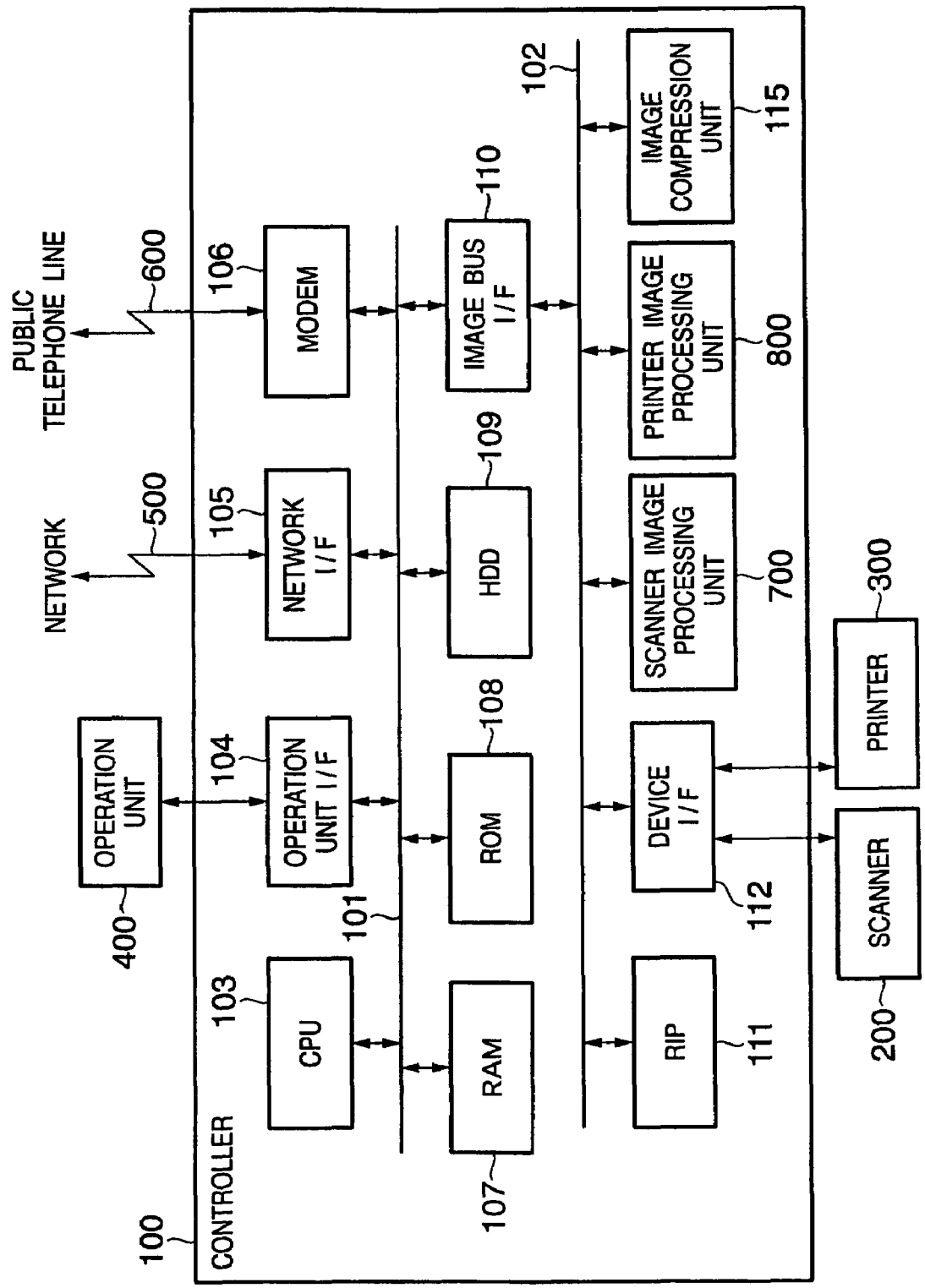
FIG. 3 is a view showing the configuration of a control system of the digital multi-functional peripheral of the first embodiment of the present invention.

FIG. 3 is a view showing the configuration of the control system of the digital multi-functional peripheral of the first embodiment of the present invention.

A controller unit 100 connects to the scanner 200 as an image input device and the printer 300 as an image output device. Also, the controller unit 100 connects to the network 500 or a telephone line 600, and inputs and outputs image information and device information.

The CPU 103 functions as a controller for controlling the whole of the digital multi-functional peripheral 250. A RAM 107 is a system work memory for allowing the CPU 103 to operate, and is also used as an image memory for temporarily storing image data. A ROM 108 is used as a boot ROM, and stores a boot program of the digital multi-functional peripheral 250, control programs for implementing the various functions, and the like.

An HDD 109 is a hard disk drive which stores system software and various data such as image data. The HDD 109 sometimes stores node information (device information), such as the image output rate and installation position of a node (device) connected to the network 500, for each address (e.g., an IP address).

An operation unit I/F (interface) 104 is a unit which interfaces with the operation unit 400, and outputs image data to be displayed on the operation unit 400 to the operation unit 400. The operation unit I/F 104 also transmits information input by the user from the operation unit 400 to the controller CPU 103.

A network I/F 105 connects to the network 500, and inputs and outputs information (e.g., image data and e-mail). A modem 106 connects to the public telephone line 600, and performs modulation/demodulation for data transmission/reception.

The above-mentioned devices are arranged on a system bus 101.

An image bus I/F 110 is a bus bridge which connects the system bus 101 and an image bus 102 for transferring image data at high speed, and converts the data structure. The image bus 102 is a high-speed bus such as a PCI bus or IEEE1394.

The image bus 102 is connected to the following devices.

A raster image processor (RIP) 111 rasterizes a page description language such as a PDL code into a bitmap image. A device I/F unit 112 connects the scanner 200 and printer 300 as image input/output devices to the controller unit 100, and performs synchronous/asynchronous conversion of image data.

A scanner image processing unit 700 executes various image processing operations such as correction, processing, and editing on input image data. A printer image processing unit 800 executes, on image data to be printed out, various image processing operations such as correction and resolution conversion corresponding to the printing settings of the printer 300. An image compression unit 115 executes a compression/decompression process, e.g., JPEG on multilevel image data and JBIG, MMR, or MH on binary image data.

Details of the arrangement of the scanner image processing unit 700 will be described below with reference to FIG. 4.

<Scanner Image Processing Unit>

Figure 4:
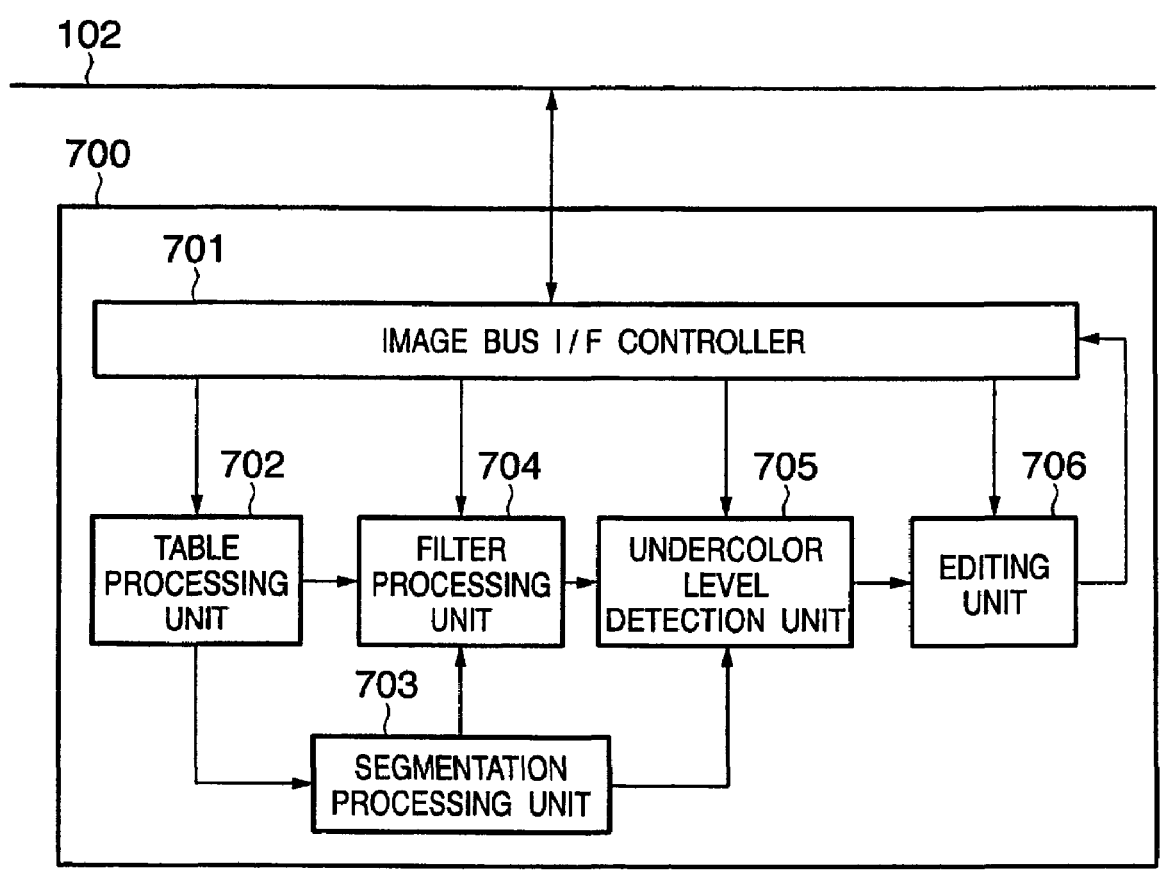
FIG. 4 is a view showing details of the arrangement of a scanner image processing unit of the first embodiment of the present invention.

FIG. 4 is a view showing details of the arrangement of the scanner image processing unit of the first embodiment of the present invention.

An image bus I/F controller 701 connects to the image bus 102 to control its bus access sequence, controls each device in the scanner image processing unit 700, and generates timings for each device.

A table processing unit 702 executes table conversion for correcting luminance data of a read image by taking the scanner characteristics into account. A segmentation processing unit 703 determines an image region by detecting a text portion from an input image, and generates an image region signal to be used in image processing later.

A filter processing unit 704 executes a convolution operation by using a digital spatial filter matching the purpose such as edge emphasis. An undercolor level detection unit 705 collects the frequencies of pixel values in one page of an image, and, if the image is a read image having a light color on the background, detects an undercolor level to be removed from the read image. An editing unit 706 detects a closed region indicated by a marker pen from input image data, and executes image processing such as shading, halftoning, or negative-positive reversal on image data in the closed region.

The processed image data is transferred onto the image bus 102 again via the image I/F bus controller 701.

Details of the arrangement of the printer image processing unit 800 will be explained below with reference to FIG. 5.

<Printer Image Processing Unit>

Figure 5:
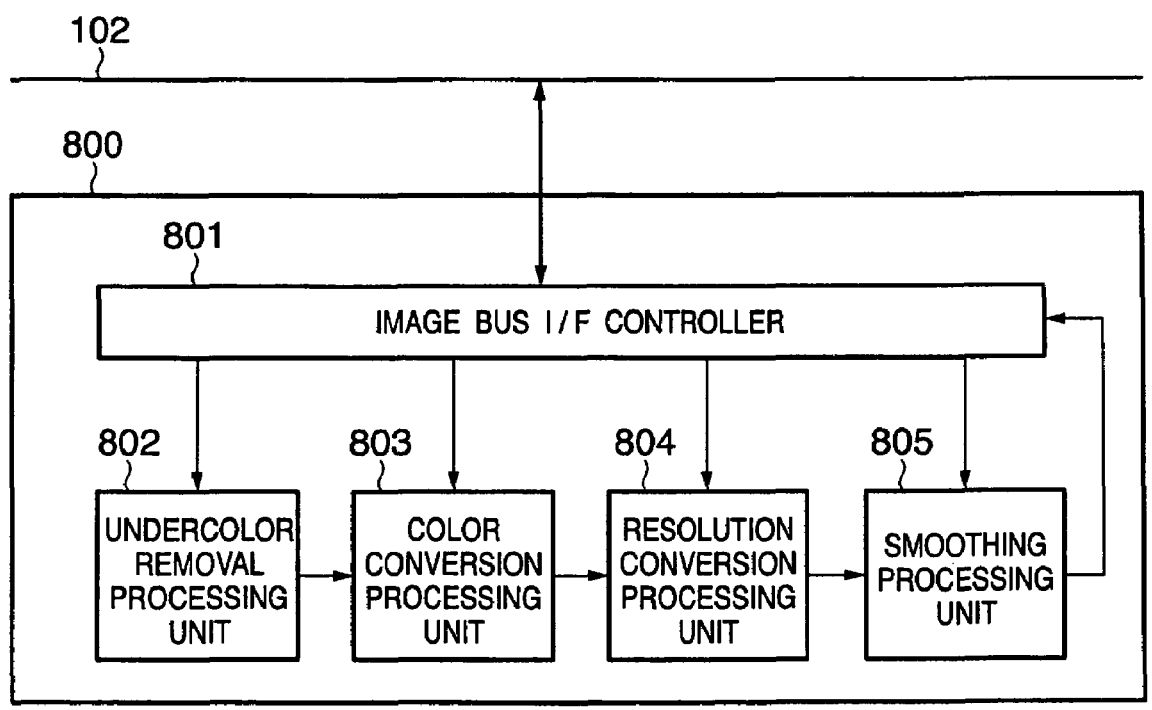
FIG. 5 is a view showing details of the arrangement of a printer image processing unit of the first embodiment of the present invention.

FIG. 5 is a view showing details of the arrangement of the printer image processing unit of the first embodiment of the present invention.

An image bus I/F controller 801 connects to the image bus 102 to control its bus access sequence, controls each device in the printer image processing unit 800, and generates timings for each device.

An undercolor removal processing unit 802 removes the background color of image data on the basis of the undercolor level detected by the undercolor level detection unit 705. A color conversion processing unit 803 executes color conversion matching the output characteristics of the printer 300 on image data. A resolution conversion processing unit 804 executes resolution conversion for converting the resolution of image data received from the network 500 or telephone line 600 into the resolution of the printer 300. A smoothing processing unit 805 executes a process of smoothing the jaggy of the resolution-converted image data.

The processed image data is transferred onto the image bus 102 again via the image bus I/F controller 801.

Details of the arrangement of the operation unit 400 will be explained below with reference to FIG. 6.

<Operation Unit>

Figure 6:
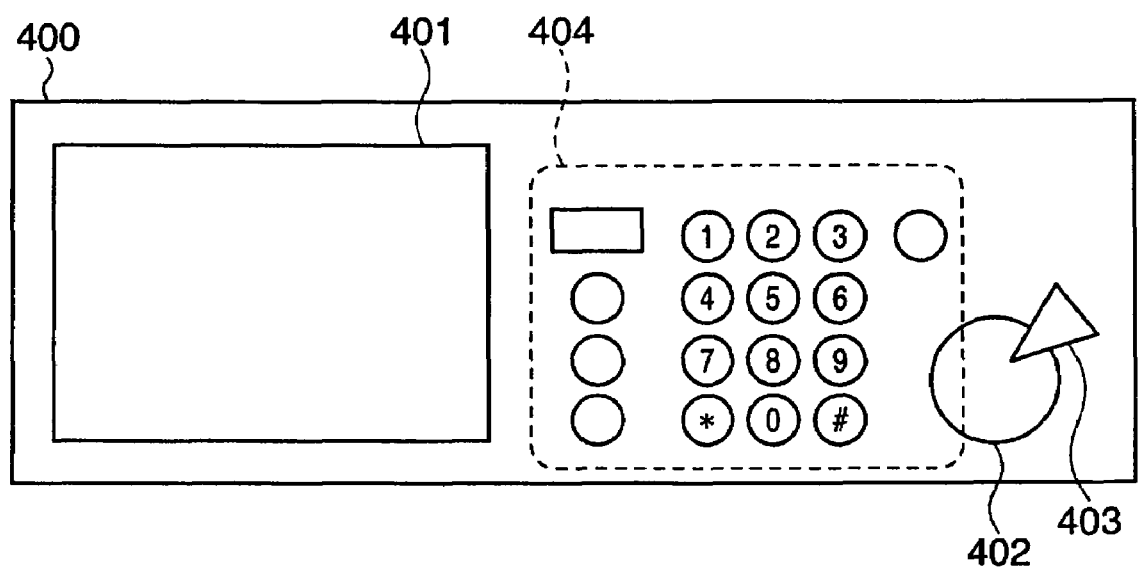
FIG. 6 is a view showing details of the arrangement of an operation unit 400 of the first embodiment of the present invention.

FIG. 6 is a view showing details of the arrangement of the operation unit 400 of the first embodiment of the present invention.

In the operation unit 400, a liquid crystal operation panel 401 is a combination of a liquid crystal and touch panel, and displays the contents of settings, software keys, and the like. A start key 402 is a hardware key for designating the start of processing such as a copy operation.

The start key 402 incorporates green and red LEDs. The green LED emits light when the start is possible, and the red LED emits light when the start is impossible. A stop key 403 is a hardware key which is used to stop the operation. Hardware keys 404 include a ten-key pad, clear key, reset key, guide key, and user mode key.

An example of an operation window displayed on the operation unit 400 will be described with reference to FIG. 7.

Figure 7:
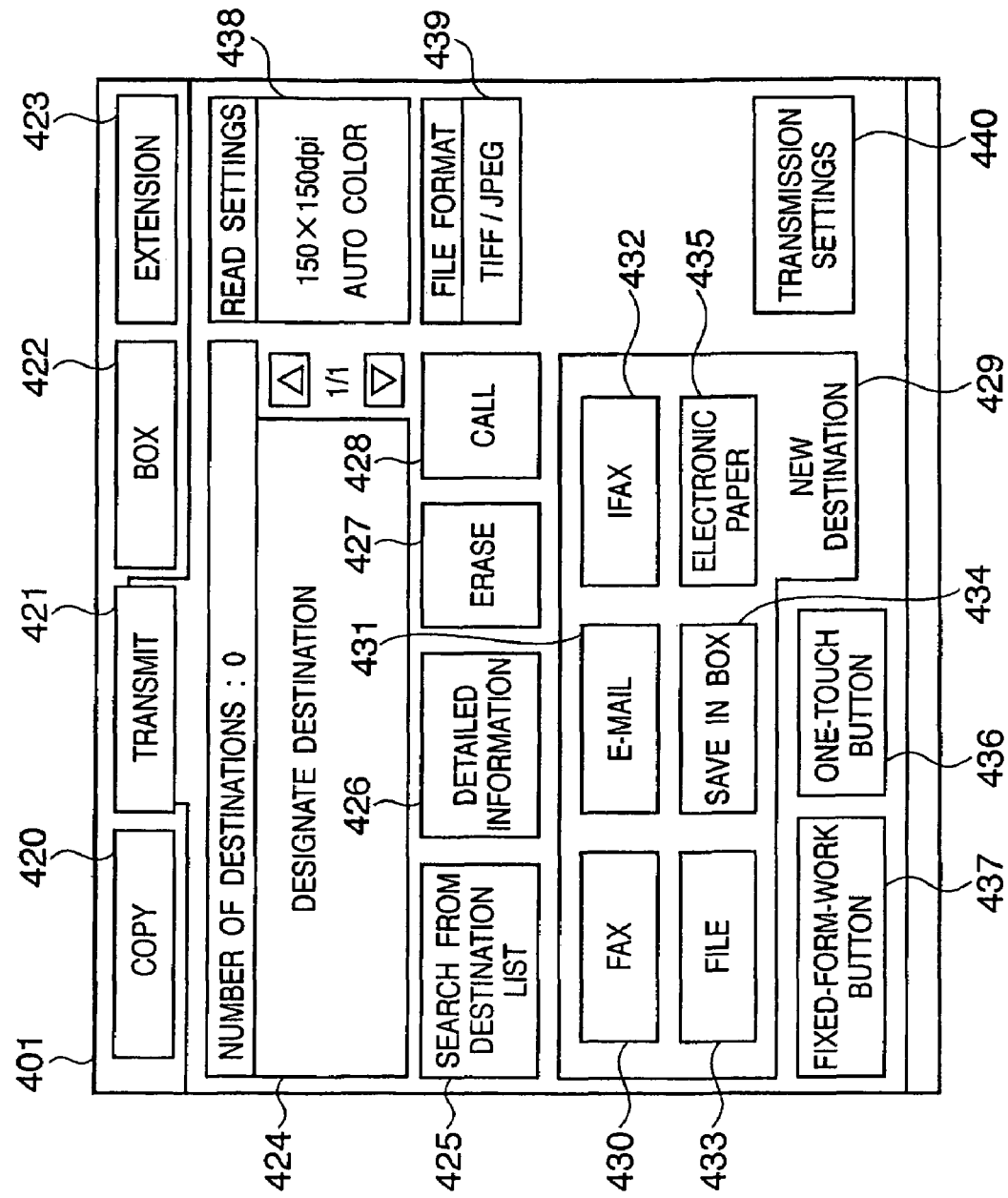
FIG. 7 is a view showing an example of an operation window of the operation unit of the first embodiment of the present invention.

FIG. 7 is a view showing the example of the operation window displayed on the operation unit of the first embodiment of the present invention.

FIG. 7 shows a normal initial operation window displayed on the liquid crystal operation panel 401.

This initial operation window includes function select buttons 420 to 423. These function select buttons are assigned a copy function, transmit function, box operation function, and extend function. The user can select a desired one of these function select buttons.

FIG. 7 shows a state in which the transmit function is selected by the function select button 421. A destination display area 424 displays a currently set transmission destination. The user touches a search-from-destination-list button 425 to select a transmission destination from a destination list prestored in the device (e.g., the HDD 109) or from a destination list stored in a location (e.g., another digital multi-functional peripheral, a server, or a client) which can be referred to on the network.

Note that this transmission destination is specified by, e.g., a mail address, the address of a device (e.g., another digital multi-functional peripheral, a server, or a client) on the network, or a FAX number.

When a detailed information button 426 is touched while one of the destinations displayed in the destination display area 424 is selected, detailed information of the destination is displayed. When an erase button 427 is touched while one of the destinations displayed in the destination display area 424 is selected, the selected destination is erased. A call button 428 is used to call the settings of a previously operated transmit function.

A new destination button 429, fixed-form-work button 437, and one-touch button 436 can be selected one at a time, and, if one of these buttons is selected, a corresponding tab window is displayed. Referring to FIG. 7, the new destination button 429 is selected, and a corresponding tab window is displayed.

This tab window corresponding to the new destination button 429 includes a FAX button 430, e-mail button 431, Internet FAX (IFAX) button 432, file button 433, save-in-box button 434, and electronic paper button 435.

When one of the buttons 430 to 435 is touched, a destination input window in which destination settings can be directly input appears. When the user sets a destination by an input method corresponding to each button in this destination input window and touches an OK button (not shown), the set destination is added to the destination display area 424.

For example, when the FAX button 430 is touched, a destination input window for inputting the FAX number of a destination is displayed. When the e-mail button 431 is touched, a destination input window for inputting the mail address of a destination is displayed.

A read setting display area 438 displays the read settings, such as the presently set read resolution (e.g., 150×150 dpi), color mode, and document type, for reading a document from the scanner 200. Note that the read settings can be freely set by the user via the operation unit 400.

A file format display area 439 displays the presently set transmission file format to be used to, e.g., transmit e-mail by attaching image data to it. This transmission file format can also be freely set by the user via the operation unit 400. A transmission setting button 440 is used to set details of e-mail transmission. When the transmission setting button 440 is touched, a detail setting window is displayed.

<Transmission Setting Method>

In a case in which when image data obtained by scanning a document by the digital multi-functional peripheral 250 is to be transmitted by e-mail, the user designates the destination (transmission destination address) in the initial operation window shown in FIG. 7 and touches the transmission setting button 440, a detail setting window related to the transmission is displayed. In this detail setting window, the user can set details of the e-mail transmission.

An example of this detail setting window will be explained with reference to FIG. 8.

Figure 8:
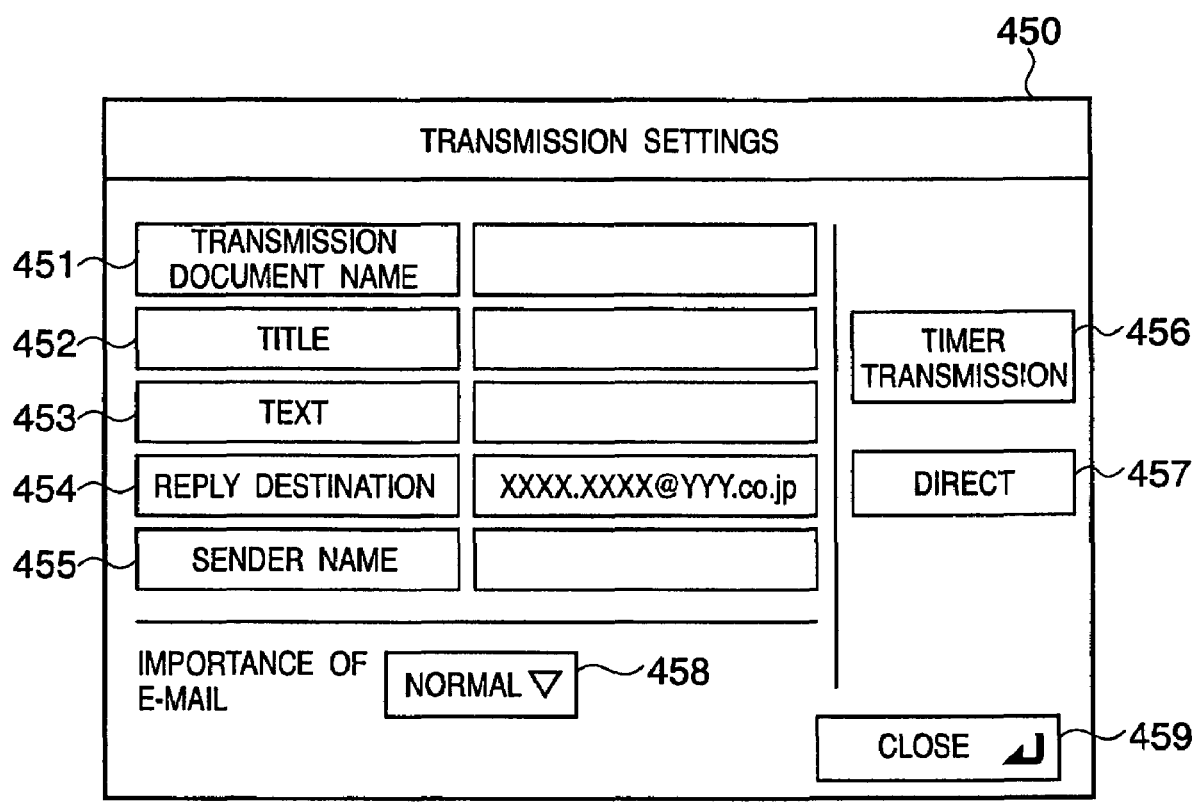
FIG. 8 is a view showing an example of a detail setting window of the first embodiment of the present invention.

FIG. 8 is a view showing an example of the detail setting window of the first embodiment of the present invention.

FIG. 8 shows a detail setting window 450 displayed on the liquid crystal operation panel 401 when the transmission setting button 440 is touched.

The detail setting window 450 includes designation items for designating a transmission document name, title, text, reply destination address, and sender name related to e-mail or FAX. When buttons 451 to 455 corresponding to these designation items are touched, the respective corresponding items can be input. It is also possible to select the importance (e.g., normal, important, urgent, and secret) of e-mail from a pull-down menu 458. A timer transmission button 456 is used to designate the actual transmission time. A direct button 457 is used to perform direct transmission of FAX.

In the first embodiment, at least the reply destination address of the above designation items must be designated. This reply destination address is the address of a notification destination to be notified, if a transmission error occurs in the transmission of e-mail, of information concerning the transmission error or information for confirming retransmission.

When the user presses the start key 402 after designating the reply destination address, scan of a document to be processed is started, and e-mail to which the read image of the document is attached is transmitted to the destination designated in the initial operation window shown in FIG. 7.

Note that the user can also transmit, to the destination designated in the initial operation window shown in FIG. 7, e-mail to which not the read image of a document but image data designated from image data already stored in the HDD 109 of the digital multi-functional peripheral 250 is attached.

<E-mail Error Processing>

E-mail error processing which occurs after e-mail is transmitted by the digital multi-functional peripheral 250 will be described below with reference to FIG. 9.

FIG. 9 is a flowchart showing the e-mail error processing of the first embodiment of the present invention.

Note that this processing occurs after the digital multi-functional peripheral 250 executes the operation of transmitting e-mail to which the read image of a document is attached. Note also that the digital multi-functional peripheral 250 stores, in the HDD 109, the copies of e-mail to be transmitted and a file (image) attached to the e-mail, in addition to those to be transmitted, by assuming that a transmission error may occur.

The following processing is also applicable to the operation of transmitting e-mail to which not the read image of a document but image data received from an external apparatus via the network 500 or public telephone line 600 and stored in the HDD 109 is attached.

In step S91, the reception of a transmission error notification from a mail server is monitored. If no transmission error notification is received (NO in step S91), the reception is waited for. If a transmission error notification is received (YES in step S91), the flow advances to step S92.

In step S92, transmission error notification analysis is executed. On the basis of the result of this analysis, whether the contents of the error indicate size excess is determined in step S93. That is, it is determined whether the e-mail is not delivered to the destination due to size excess (whether the transmitting operation is interrupted by the mail server). If the cause is not size excess (NO in step S93), the processing is terminated. If the cause is size excess (YES in step S93), the flow advances to step S94.

Note that "size excess" means that the data size of e-mail to which image data to be processed is attached has exceeded a predetermined size. Note also that a transmission error notification corresponding to this size excess contains image data attached to the e-mail which cannot be transmitted, or an ID indicating the storage destination of the image.

In step S94, size excess error processing is executed.

<Size Excess Error Processing>

Details of the size excess error processing will be explained below with reference to FIG. 10.

Figure 10:
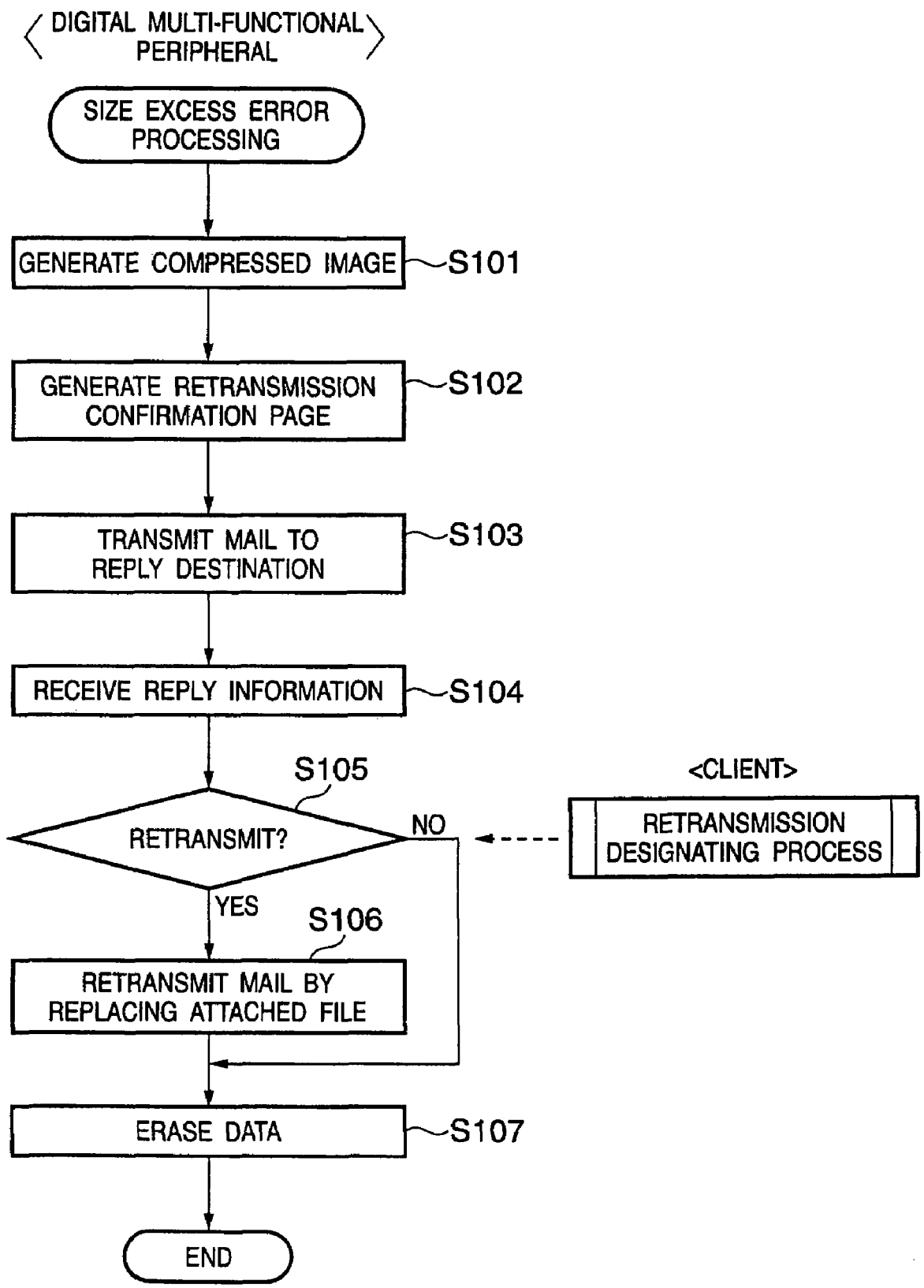
FIG. 10 is a flowchart showing details of size excess error processing of the first embodiment of the present invention.

FIG. 10 is a flowchart showing details of the size excess error processing of the first embodiment of the present invention.

Note that this processing shown in FIG. 10 is executed by the digital multi-functional peripheral 250 if a transmission error occurs due to size excess.

In step S101, the original image attached to the transmission error notification or the original image in the HDD 109 indicated by the ID contained in the error notification is compressed to be smaller than the document file size, thereby generating a compressed image. This compressed image is temporarily stored in the HDD 109.

Note that the method of reducing the file size can be any of, e.g., increasing the compression ratio, reducing the number of pixels, and compressing color information.

In step S102, on the basis of the original image, the compressed image, and the information such as the destination, title, text, sender, reply destination information, and transmission date/time of the original e-mail in which the transmission error has occurred, a retransmission confirmation page (a webpage (e.g., data described in a structured page description language such as HTML or XML)) is generated as retransmission confirmation information.

More specifically, as will be described later, this retransmission confirmation page contains, e.g., error information indicating the occurrence of a transmission error in the e-mail, an image attached to the e-mail, a compressed image of the attached image, and designate input accept information for accepting designate input which designates whether to execute retransmission of the e-mail in which the transmission error has occurred.

This retransmission confirmation page is registered in, e.g., the web server 155. Alternatively, if the mail servers 150 to 152 and the digital multi-functional peripheral 250 have a web server function, the retransmission confirmation page may also be registered in one of them.

In step S103, retransmission confirmation e-mail containing information indicating the occurrence of the transmission error and the reference destination (e.g., the URL) of the webpage generated in step S102 is transmitted to the destination (client) at the mail address designated as the reply destination in the detail setting window shown in FIG. 8.

The user (client) having received this retransmission confirmation e-mail transmits reply information indicating whether to execute or cancel the e-mail retransmitting operation, by a retransmission designating process (FIG. 11) to be described later.

Note that instead of this retransmission confirmation e-mail, the information indicating the occurrence of the transmission error and the reference destination (e.g., the URL) of the webpage may also be transmitted to the designated client by another notification means such as an exclusive dialogue or messenger function. In either case, any arrangement can be used as long as the information indicating the occurrence of the transmission error and the reference destination (e.g., the URL) of the webpage can be transmitted to the designated client.

In step S104, the reply information from the client (user) having received the retransmission confirmation e-mail is received. In step S105, whether to execute the retransmission of the e-mail is determined on the basis of the contents of the reply information. If no retransmission is to be executed (NO in step S105), the flow advances to step S107. In step S107, the e-mail to be transmitted, the file (image) attached to the e-mail, and the compressed image generated in step S101 are erased from the HDD 109.

If the retransmission is to be executed (YES in step S105), the flow advances to step S106. In step S106, the retransmission is executed by replacing the file (image) attached to the original e-mail with the compressed image generated in step S101. After that, in step S107, the e-mail to be transmitted, the file (image) attached to the e-mail, and the compressed image generated in step S101 are erased from the HDD 109.

<Retransmission Designating Process by User>

A retransmission designating process executed by the client (e.g., the computer 152 or 153) having received the retransmission confirmation e-mail from the digital multi-functional peripheral 205 will be explained below with reference to FIG. 11.

Figure 11:
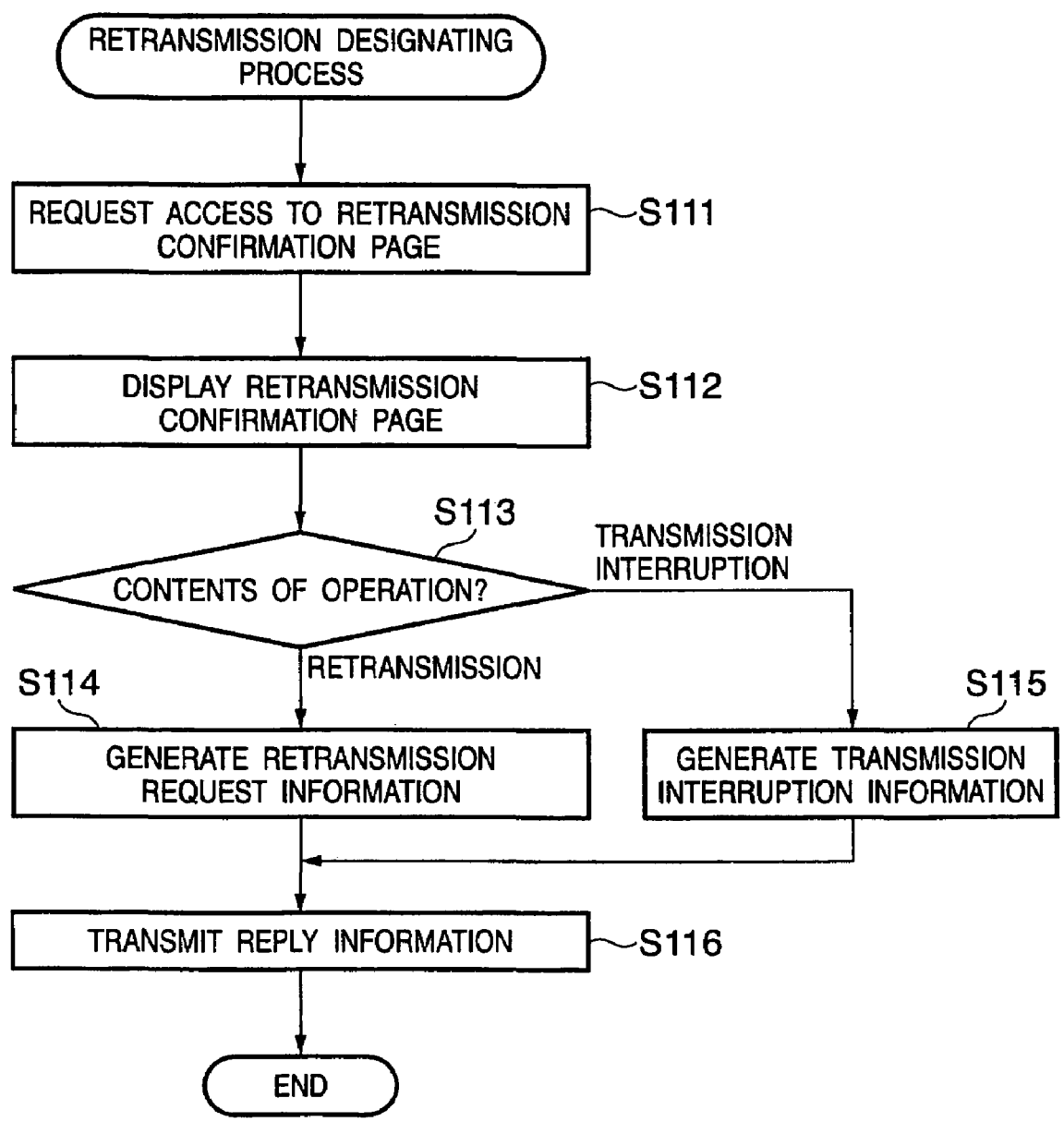
FIG. 11 is a flowchart showing details of a retransmission designating process of the first embodiment of the present invention.

FIG. 11 is a flowchart showing details of the retransmission designating process of the first embodiment of the present invention.

In step S111, a request for access to the webpage designated by the retransmission confirmation e-mail is issued to the manager (e.g., the web server 155) of the webpage. In step S112, the webpage provided by the web server is displayed in response to the access request. This webpage allows the user to refer to a retransmission confirmation window in which he or she can designate whether to execute the retransmission of the e-mail in which the transmission error has occurred.

An example of this retransmission confirmation window will be explained with reference to FIG. 12.

Figure 12:
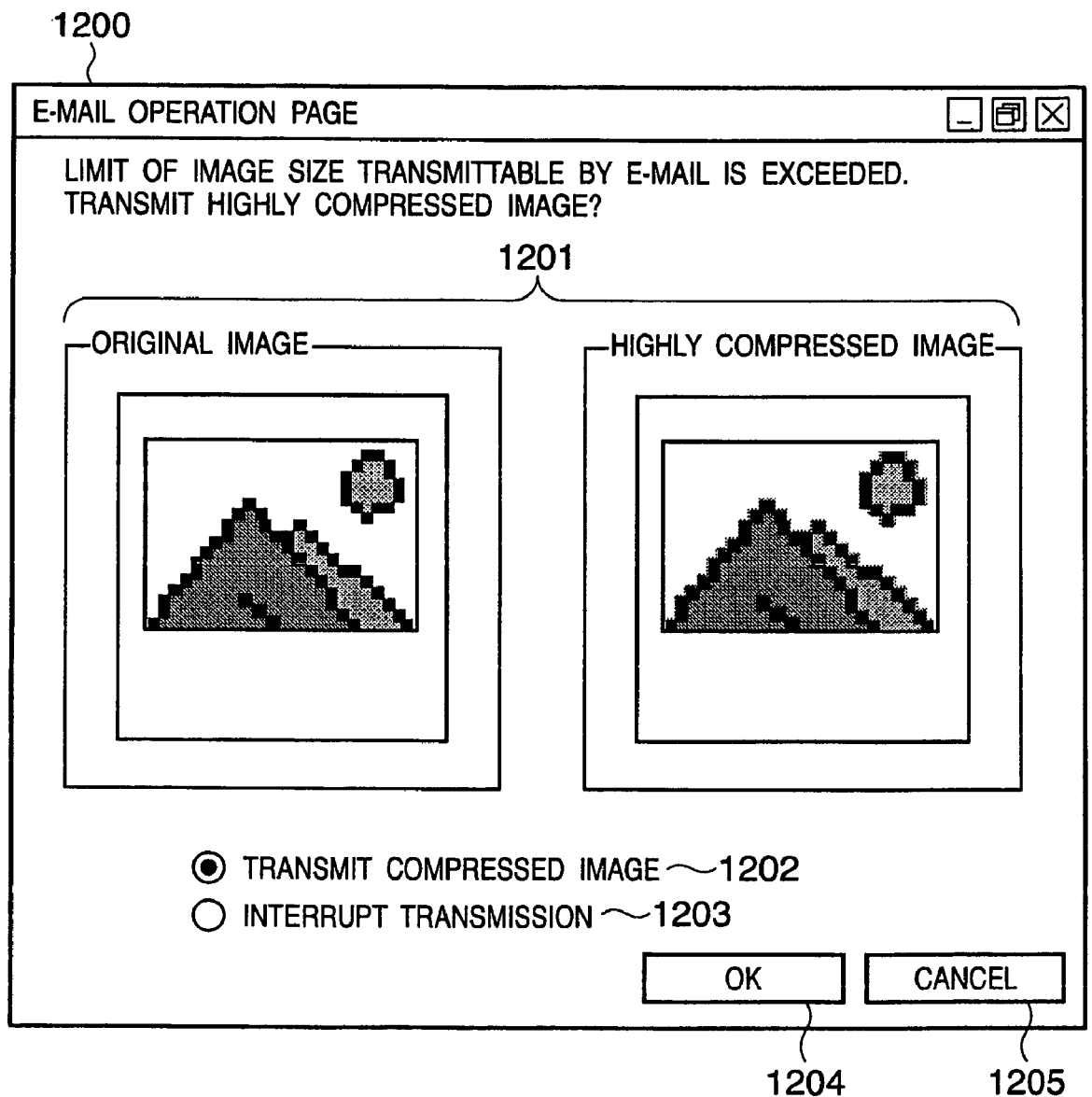
FIG. 12 is a view showing an example of a retransmission confirmation window of the first embodiment of the present invention.

FIG. 12 is a view showing the example of the retransmission confirmation window of the first embodiment of the present invention.

A retransmission confirmation window 1200 includes a comparative display area 1201 which displays information indicating the occurrence of a transmission error, an original image attached to e-mail to be transmitted, and a compressed image formed by compressing the file size, a radio button 1202 ("TRANSMIT COMPRESSED IMAGE") for designating retransmission of the e-mail by attaching the compressed image in place of the original image, and a radio button 1203 ("INTERRUPT TRANSMISSION") for interrupting transmission.

When the user touches an OK button 1204 while the radio button 1202 or 1203 is selected, information corresponding to the selected radio button (designation of retransmission of the e-mail by attaching the compressed image/interruption of transmission) is transmitted as reply information to the digital multi-functional peripheral 250. If a cancel button 1205 is touched, the display in the retransmission confirmation window 1200 is erased.

As described above, the user can confirm whether to execute retransmission of the e-mail by replacing the original image attached to the e-mail with the compressed image, after comparing the original image with the compressed image by referring to the retransmission conformation window 1200.

The explanation with return to FIG. 11.

In step S113, the contents of the operation in the retransmission confirmation window 1200 are determined. If the OK button 1204 is touched while the radio button 1202 is selected, it is determined that retransmission is to be performed, and the flow advances to step S114. In step S114, retransmission designating information which designates execution of retransmission of the e-mail by replacing the document image with the compressed image is generated.

On the other hand, if the OK button 1204 is touched while the radio button 1203 is selected, it is determined that transmission is to be interrupted, and the flow advances to step S115. In step S115, transmission interrupting information which designates interruption of transmission is generated.

In step S116, reply information (confirmation result information) containing the information generated in step S114 or S115 is transmitted to the digital multi-functional peripheral 250.

In the first embodiment as described above, if a transmission error occurs due to volume excess of e-mail which is transmitted from a digital multi-functional peripheral capable of transmitting/receiving e-mail and to which an image file is attached, the user who has requested the transmission of the e-mail can readily find the fact of the occurrence of the error on a client which he or she usually operates, even if he or she is away from the digital multi-functional peripheral.

Also, the first embodiment provides the arrangement in which if an error occurs, the comparison of an image currently being attached to the e-mail with a compressed image formed by reducing the file size is displayed for the user to allow him or her to determine whether to execute retransmission by using the compressed image.

Especially because this arrangement is implemented on a client operated by the user, it is possible to effectively reduce operation steps pertaining to the retransmitting operation, and prevent retransmission unwanted by the user.

Second Embodiment

In the first embodiment, the arrangement in which retransmission confirmation information of e-mail is notified by using a webpage if a transmission error of the e-mail occurs is explained. In the second embodiment, an arrangement in which retransmission confirmation information is notified by e-mail (retransmission confirmation mail) to be transmitted to the notification destination of a transmission error (the reply destination address of the document e-mail) will be explained.

Especially in this case, a thumbnail image of the original image attached to the e-mail in which the transmission error has occurred and a thumbnail image of a compressed image of the original image are generated and attached to the retransmission confirmation mail. This allows the user to determine whether to retransmit the e-mail by replacing the original image with the compressed image, as in the first embodiment.

Note that the e-mail error processing of the second embodiment is the same as FIG. 9 of the first embodiment except for the contents of the size excess error processing in step S94. Therefore, the size excess error processing in the second embodiment will be explained below with reference to FIG. 13.

<Size Excess Error Processing>

Figure 13:
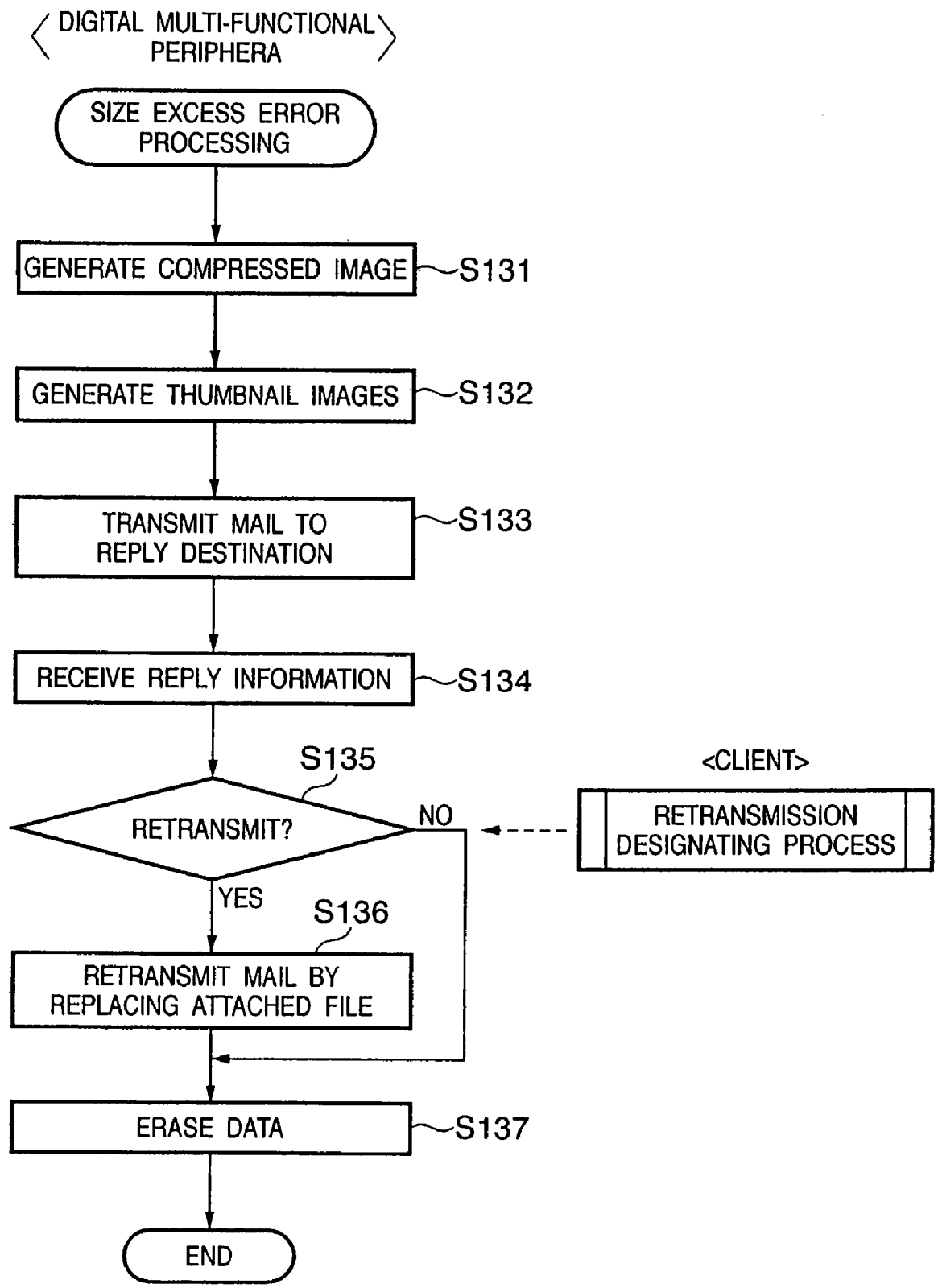
FIG. 13 is a flowchart showing details of size excess error processing of the second embodiment of the present invention.

FIG. 13 is a flowchart showing details of the size excess error processing of the second embodiment of the present invention.

In step S131, the original image attached to the transmission error notification or the original image in an HDD 109 indicated by the ID contained in the error notification is compressed to be smaller than the original file size, thereby generating a compressed image. This compressed image is temporarily stored in the HDD 109.

In step S132, thumbnail images of the original image and compressed image are generated. These thumbnail images are temporarily stored in the HDD 109. Note that these thumbnail images are generated by thinning information such as the number of pixels of the image to be processed, by using an image compression unit 115.

In step S133, retransmission confirmation e-mail to which these thumbnail images are attached and which contains information indicating the occurrence of the transmission error is generated, and transmitted to the destination (client) of the mail address designated by the reply destination in the detail setting window shown in FIG. 8.

In step S134, reply information (e-mail) is received from the client (user) having received the retransmission confirmation e-mail. In step S135, whether to execute the retransmission of the e-mail is determined on the basis of the contents of the reply information. If no retransmission is to be executed (NO in step S135), the flow advances to step S137. In step S137, the e-mail to be transmitted, the file (image) attached to the e-mail, the compressed image generated in step S131, and the thumbnail images generated in step S132 are erased from the HDD 109.

If the retransmission is to be executed (YES in step S135), the flow advances to step S136. In step S136, the retransmission is executed by replacing the file (image) attached to the original e-mail with the compressed image generated in step S131. After that, in step S137, the e-mail to be transmitted, the file (image) attached to the e-mail, the compressed image generated in step S101, and the thumbnail images generated in step S132 are erased from the HDD 109.

<Retransmission Designating Process by User>

A retransmission designating process executed by the client (e.g., a computer 152 or 153) having received the retransmission confirmation e-mail from a digital multi-functional peripheral 250 will be explained below with reference to FIG. 14.

Figure 14:
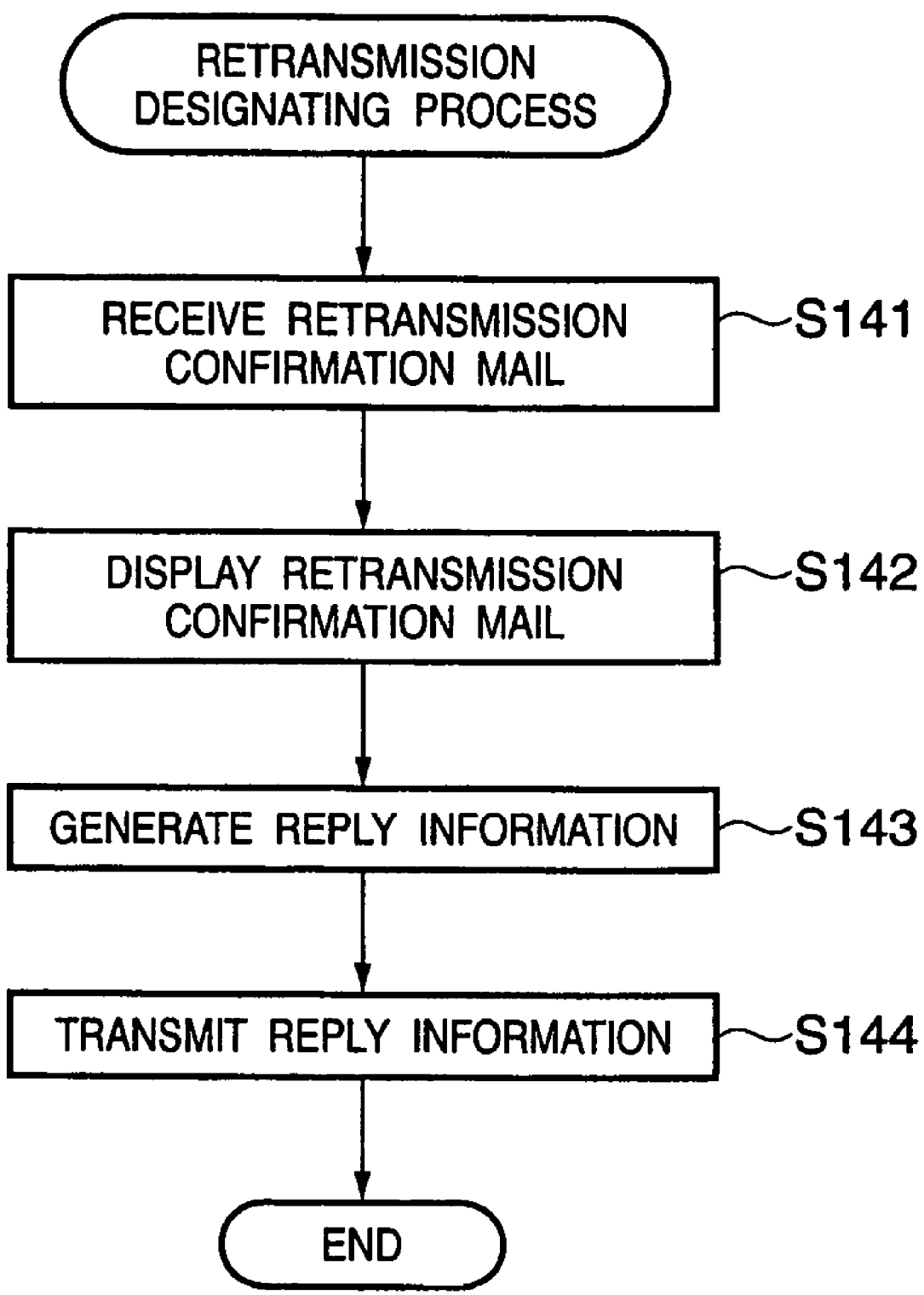
FIG. 14 is a flowchart showing details of a retransmission designating process of the second embodiment of the present invention.

FIG. 14 is a flowchart showing details of the retransmission designating process of the second embodiment of the present invention.

In step S141, retransmission confirmation e-mail is received. In step S142, the received e-mail is displayed. On the basis of this e-mail, the user can designate, by reply mail, whether to execute retransmission of the e-mail in which the transmission error has occurred.

An example of the retransmission confirmation e-mail will be explained with reference to FIG. 15.

Figure 15:
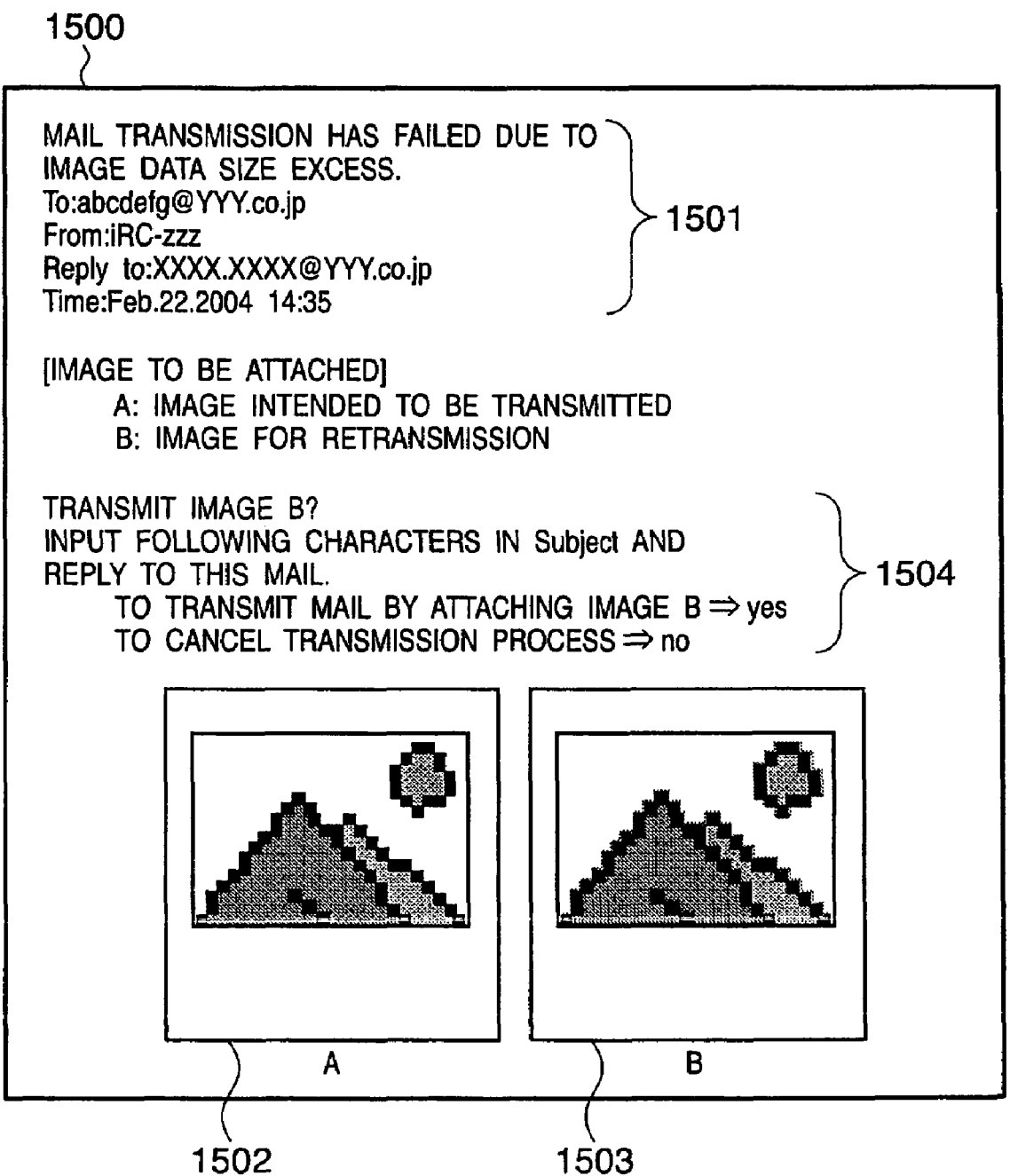
FIG. 15 is a view showing an example of retransmission confirmation e-mail of the second embodiment of the present invention.

FIG. 15 is a view showing the example of the retransmission confirmation e-mail of the second embodiment of the present invention.

Retransmission confirmation e-mail 1500 contains information 1501 indicating the occurrence of the transmission error, a thumbnail image 1502 of the original image attached to the e-mail to be transmitted, a thumbnail image 1503 of the compressed image formed by compressing the file size, and information 1504 for confirming whether to designate retransmission of the e-mail by attaching the compressed image in place of the original image or designate interruption of transmission.

Especially in this arrangement, a predetermined character string is input in a subject column of reply mail and replied, thereby notifying the digital multi-functional peripheral 250 of one of retransmission designation and transmission interruption designation. In the case shown in FIG. 15, retransmission is designated if a character string "yes" is input in the subject column of reply mail and replied, and transmission interruption is designated if a character string "no" is input and replied.

Note that in this arrangement, the digital multi-functional peripheral 250 is notified of retransmission designation or transmission interruption designation by inputting a predetermined character string in the subject column. However, the present invention is not limited to this arrangement. That is, any notification method can be used as long as the digital multi-functional peripheral 250 can interpret retransmission designation or transmission interruption designation. For example, a predetermined character string may also be notified by inputting it in the body of the reply mail.

Alternatively, blank mail having nothing in the subject column or in the mail body may also be transmitted to the digital multi-functional peripheral 250 as a notification indicating one of retransmission designation and transmission interruption designation.

In either case, any notification method can be used as long as the digital multi-functional peripheral 250 can finally interpret retransmission designation or transmission interruption designation.

The explanation with return to FIG. 14.

In step S143, reply information (reply mail) is generated on the basis of the operation for the mailer on the client. This reply information contains retransmission designation information for designating the execution of retransmission of the e-mail by replacing the original image with the compressed image, or transmission interruption information for designating the interruption of transmission. In step S144, the generated reply information (confirmation result information) is transmitted to the digital multi-functional peripheral 250.

In the second embodiment as described above, in addition to the effects explained in the first embodiment, whether to execute retransmission of e-mail can be notified by e-mail. Accordingly, it is possible to efficiently reduce operation steps related to the retransmission work even when no web function is usable or no web environment is constructed.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-167333, filed Jun. 7, 2005, which is hereby incorporated by reference herein in its entirety.

What is claimed is:

1. An e-mail transmission apparatus capable of transmitting an e-mail to which image data is attached, comprising:
    a setting unit adapted to set a transmission destination address, and a reply destination address;
    a first transmitting unit adapted to transmit an e-mail, to which image data is attached, to the transmission destination address;
    a generation unit adapted to, if a transmission error due to size excess of the e-mail transmitted by said e-mail transmitting unit occurs, generate retransmission confirmation e-mail related to retransmission confirmation information for making a user of a client apparatus corresponding to the reply destination address to designate a request for a retransmission of the e-mail in which the transmission error has occurred;
    a second transmission unit adapted to transmit the retransmission confirmation e-mail generated by said generation unit to the reply destination address set by said setting unit;
    a receiving unit adapted to receive reply information indicating that the retransmission of the e-mail is requested by the user of the client apparatus in case that the retransmission of the e-mail is requested by the user of the client apparatus in response to a transmission of the retransmission confirmation e-mail; and
    a retransmission unit adapted to transmit an e-mail attached to image data, whose size is smaller than a size of the image data attached to the e-mail in which the transmission error has occurred, to the transmission destination address set by said setting unit in a case where the reply information is received by said receiving unit; and
    a registration unit adapted to register the retransmission confirmation information in an apparatus different from the client apparatus,
    wherein the generation unit generates the retransmission confirmation e-mail which contains reference information for referring to the retransmission confirmation information registered by said registration unit.

2. The apparatus according to claim 1, further comprising a compression unit adapted to generate compressed image data of the image data attached to the e-mail,
    wherein said generation unit generates the retransmission confirmation information by a webpage described in a structured page description language, and
    the webpage comprises:
    the error information;
    the image data attached to the e-mail in which the transmission error has occurred;
    the compressed image data corresponding to the image data; and
    the designate input accept information.

3. The apparatus according to claim 1, further comprising a compression unit adapted to generate compressed image data of the image data attached to the e-mail,
    wherein said compression unit generates thumbnail image data of the image data attached to the e-mail in which the transmission error has occurred, and thumbnail image data of the compressed image data corresponding to the image data,
    said generation unit generates e-mail containing the retransmission confirmation information, and
    the e-mail comprises:
    the error information;
    the thumbnail image data of the image data attached to the e-mail in which the transmission error has occurred;
    the thumbnail image data of the compressed image data corresponding to the image data; and
    the designate input accept information.

4. The apparatus according to claim 1, further comprising:
    a reading unit adapted to read a document; and
    an input unit adapted to input image data across a network,
    wherein the designated image data comprises one of image data obtained by said reading unit and image data input from said input unit.

5. The apparatus according to claim 1, wherein said receiving unit receives a reply e-mail containing the reply information in case that the retransmission of the e-mail is requested by the user of the client apparatus in response to a transmission of the retransmission confirmation e-mail.

6. A control method of an e-mail transmission apparatus capable of transmitting an e-mail to which image data is attached, comprising:
  setting a transmission destination address, and a reply destination address;
  transmitting an e-mail, to which image data is attached, to a transmission destination address;
  generating retransmission confirmation e-mail related to retransmission confirmation information for making a user of a client apparatus corresponding to the reply destination address to designate a request for a retransmission of the e-mail in which the transmission error has occurred if a transmission error due to size excess of the e-mail transmitted by said e-mail transmitting unit occurs;
  transmitting the retransmission confirmation e-mail to the reply destination address;
  receiving reply information indicating that the retransmission of the e-mail is requested by the user of the client apparatus in case that the retransmission of the e-mail is requested by the user of the client apparatus in response to a transmission of the retransmission confirmation e-mail; and
  transmitting an e-mail attached to image data, whose size is smaller than a size of the image data attached to the e-mail in which the transmission error has occurred, to the transmission destination address in a case where the reply information is received; and
  registering the retransmission confirmation information in an apparatus different from the client apparatus,
  wherein the generating step generates the retransmission confirmation e-mail which contains reference information for referring to the retransmission confirmation information registered in said registration step.

7. The control method according to claim 6, further comprising generating compressed image data of the image data attached to the e-mail,
  wherein said generating step generates the retransmission confirmation information by a webpage described in a structured page description language, and
  the webpage comprises:
  the error information;
  the image data attached to the e-mail in which the transmission error has occurred;
  the compressed image data corresponding to the image data; and
  the designate input accept information.

8. The control method according to claim 6, further comprising generating compressed image data of the image data attached to the e-mail, generating thumbnail image data of the image data attached to the e-mail in which the transmission error has occurred, and generating thumbnail image data of the compressed image data corresponding to the image data, wherein said generating step generates e-mail containing the retransmission confirmation information, and
  the e-mail comprises:
  the error information;
  the thumbnail image data of the image data attached to the e-mail in which the transmission error has occurred;
  the thumbnail image data of the compressed image data corresponding to the image data; and
  the designate input accept information.

9. The control method according to claim 6, further comprising reading a document by a reading unit; and inputting image data across a network by an input unit,
  wherein the designated image data comprises one of image data obtained by said reading unit and image data input from said input unit.

10. The control method according to claim 6, wherein said receiving step receives a reply e-mail containing the reply information in case that the retransmission of the e-mail is requested by the user of the client apparatus in response to a transmission of the retransmission confirmation e-mail.

11. A program stored on a computer-readable medium for causing a computer to control an e-mail transmission apparatus capable of transmitting an e-mail to which image data is attached, the program causing the computer to execute the steps of:
  setting a transmission destination address, and a reply destination address;
  transmitting an e-mail, to which image data is attached, to a transmission destination address;
  generating retransmission confirmation e-mail related to retransmission confirmation information for making a user of a client apparatus corresponding to the reply destination address to designate a request for a retransmission of the e-mail in which the transmission error has occurred if a transmission error due to size excess of the e-mail transmitted by said e-mail transmitting unit occurs;
  transmitting the retransmission confirmation e-mail to the reply destination;
  receiving reply information indicating that the retransmission of the e-mail is requested by the user of the client apparatus in case that the retransmission of the e-mail is requested by the user of the client apparatus in response to a transmission of the retransmission confirmation e-mail; and
  transmitting an e-mail attached to image data, whose size is smaller than a size of the image data attached to the e-mail in which the transmission error has occurred, to the transmission destination address in a case where the reply information is received; and
  registering the retransmission confirmation information in an apparatus different from the client apparatus,
  wherein the generating step generates the retransmission confirmation e-mail which contains reference information for referring to the retransmission confirmation information registered in said registration step.

* * * * *